United States Patent [19]

Garshelis

[11] Patent Number: 4,950,988
[45] Date of Patent: Aug. 21, 1990

[54] TWO REGION, REMANENTLY MAGNETIZED POSITION SENSOR

[76] Inventor: Ivan J. Garshelis, 176 South Mountain Rd., Pittsfield, Mass. 01201

[21] Appl. No.: 308,542

[22] Filed: Feb. 10, 1989

Related U.S. Application Data

[63] Continuation-in-part of Ser. No. 155,140, Feb. 11, 1988, abandoned.

[51] Int. Cl.[5] .................. G01B 7/14; G01F 23/62
[52] U.S. Cl. .................. 324/207.24; 73/314; 324/207.14; 324/207.16; 340/870.33
[58] Field of Search .................. 324/207, 208; 73/314; 340/870.33

[56] References Cited

U.S. PATENT DOCUMENTS

| | | | |
|---|---|---|---|
| 3,128,625 | 4/1964 | Heineman | 340/870.33 X |
| 3,305,770 | 2/1967 | Hulls . | |
| 3,332,009 | 7/1967 | Seale . | |
| 3,480,854 | 11/1969 | Jaquith et al. . | |
| 3,898,555 | 8/1975 | Tellerman . | |
| 3,958,202 | 5/1976 | Sidor . | |
| 3,958,203 | 5/1976 | Bernin | 340/870.33 X |
| 4,071,818 | 1/1978 | Krisst . | |
| 4,121,185 | 10/1978 | Genz . | |
| 4,194,397 | 3/1980 | Yasuda | 73/314 |
| 4,457,171 | 7/1984 | Gebauer . | |
| 4,774,465 | 9/1988 | Nilius | 340/870.33 X |
| 4,841,246 | 6/1989 | Juds et al. | 324/208 |

FOREIGN PATENT DOCUMENTS

| | | | |
|---|---|---|---|
| 2415233 | 10/1975 | Fed. Rep. of Germany . | |
| 2302503 | 10/1976 | France | 324/208 |
| 0020063 | 2/1977 | Japan | 324/207 |
| 0076056 | 7/1978 | Japan | 324/208 |
| 0115150 | 9/1979 | Japan | 324/208 |
| 0567090 | 7/1977 | U.S.S.R. | 324/208 |

OTHER PUBLICATIONS

Garshelis et al., paper No. ER-14, "A Magnetic Position Sensor", 4th Joint MMM-Intermag Conference, Vancouver, B.C., Canada, Jul. 13, 1988. Also cited as J. Appl. Phys., 64(10), 5699-5701, Nov. 15, 1988.
Garshelis et al., "An Improved Magnetic Position Sensor", 2 pages, submitted Dec., 1988 to Intermag '89, Washington, D.C.
MTS Systems Corporation, "Level Plus Tank Monitoring Systems", 1987 Sales Brochure.

*Primary Examiner*—Gerard R. Strecker
*Attorney, Agent, or Firm*—Sixbey, Friedman, Leedom & Ferguson

[57] ABSTRACT

A position sensor and method for detecting and providing an indication of the position of a movable member comprising a ferromagnetic element oriented substantially parallel to the path of travel of the movable member, the element including a segment thereof having spaced-apart ends defining the positional limits between which movement of the movable member is to be monitored, the segment comprising a pair of contiguous, oppositely polarized, remanently magnetized regions defining an intersection along the length of the segment; a magnet positioned proximate the intersection and mounted in known spatial relationship to the movable member for movement therewith, and, simultaneously along the ferromagnetic element, the magnet providing a magnetic field presenting a constant polarity to the element and having a strength sufficient to locally polarize the element, whereby movement of the magnet means along the element alters the length of the respective regions; and, means for sensing the position of the intersection without altering that position and for providing an indication of the position of the movable member based thereon.

34 Claims, 5 Drawing Sheets

TWO REGION, REMANENTLY MAGNETIZED POSITION SENSOR

CROSS REFERENCE TO RELATED APPLICATIONS

This application is a continuation-in-part of U.S. application Serial No. 155,140, filed Feb. 11, 1988, now abandoned.

TECHNICAL FIELD

The present invention relates generally to position sensors and to methods employing such sensors for detecting and providing an indication of the position of a movable member and, more particularly, to position sensors and methods employing magnetic means for non-contact position sensing.

BACKGROUND ART

The ability to obtain and indicate, in a useful manner, highly accurate information regarding the position of a movable member is very important in controlling tools, equipment and apparatus, monitoring processes, determining liquid level, and for many other purposes. Typically, due to the nature of the tools, equipment, apparatus or process, the environment in which they operate and the need for continuous position information, the determination of position is usually accomplished by a position sensor installed proximately to the member whose position is being sensed but out of contact therewith in order to avoid interfering with or influencing in any way the movement of the member. Moreover, the position sensed will, most usually, be transmitted to a location remote from the movable member where it may be observed, recorded or used to control the operation of equipment or processes.

One well known way of detecting the position of a movable member without actually establishing physical contact therewith is by the use of magnetic means mounted, directly or indirectly, on the movable member for magnetically interacting with other means to produce a signal indicative of the position of the movable member. For example, in U.S. Pat. No. 4,071,818—Krisst there is disclosed a method and apparatus in which a magnetic field generator is mounted on the movable member in order to be movable therewith and an elongated ferromagnetic element is positioned adjacent and parallel to the path of movement of the member. The generated magnetic field produces a change in the Young's modulus of elasticity in an adjacent region of the ferromagnetic element such that sonic strain pulses launched along the ferromagnetic element will be partly reflected from this region of Young's modulus discontinuity. The time required for a sonic strain pulse to travel from a given point on the ferromagnetic element to the region of Young's modulus discontinuity, be partially reflected therefrom and return to a known detection point provides a measure of the position of the field generator along the ferromagnetic element. Inasmuch as the positional relationship between the field generator and any point of interest on the movable member is fixed and known, when the position of the field generator is known the corresponding position of any point of interest on the movable member is also known. The shortcoming of the Krisst apparatus is that it requires the measurement of very short times. When the length of path travelled by the sonic strain pulse is relatively long, the apparatus may be acceptably accurate for certain purposes. However, as the length of path travelled becomes short, the accuracy of the Krisst apparatus decreases rapidly Moreover, the response speed of the Krisst apparatus is relatively slow since this apparatus, like all such apparatus utilizing sonic pulses, is limited by the relatively slow travel of reflected sonic pulses and the rate of decay of echoes Moreover, the accuracy and reliability of the Krisst apparatus is adversely affected by the fact that the Young's modulus of the element varies with stress and magnetization. Therefore, it varies over the length of the member at least because the stress is greater along the upper portions of the element than along its lower portions. In addition, it may vary due to differing magnetization along its length as a result of treatments to which those portions of the member may have been subjected at various stages during its manufacture.

In U.S. Pat. No. 4,194,397—Yasuda there is shown a liquid level indicator in which a bypass flow column is affixed to the side of a tank and a magnet-containing float is disposed within the column. A housing affixed to the column but remote from the tank contains a plurality of vertically spaced-apart magnet rotors which have an initial magnetic orientation in a first position wherein the south pole is on the bottom and the north pole is on the top. As the liquid level in the column rises, the north pole on the float causes the rotors to rotate about their horizontal axes to a second position wherein the north pole is on the bottom and the south pole is on the top. Conveniently, the rotors are painted in such a manner that different colors are displayed when the rotors are in the first and second positions. In this way, the magnetic orientation within the housing changes as the float moves up and down, and such changes are visually apparent from the displayed color change The Yasuda method and apparatus is of limited usefulness and applicability. A visual indication of position by color change is impractical for a wide variety of potential sensor uses and the resolution and accuracy of such an indication is severely limited. Moreover, the Yasuda apparatus does not permit the remote indication of position or the ready application of the position information to the control of tools, equipment or processes.

It is, therefore, apparent that despite the many advances in the use of magnetic means in the detection and indication of the position of a movable member, there still exists a need for a magnetic position sensor which is significantly more economical than previous sensors, which is extremely accurate and reliable and which is readily adaptable to sensing the position of a member, irrespective of its configuration or the environment in which it operates.

DISCLOSURE OF THE INVENTION

In accordance with one broad aspect of the present invention there is provided a method and apparatus for detecting and indicating the position of a movable member in which a ferromagnetic element is positioned substantially parallel to the path of travel of the movable member, a magnet means is mounted in association with and in a fixed and known spatial relation to the movable member for movement therewith and, simultaneously, along the length of the ferromagnetic element for defining a pair of contiguous, oppositely polarized, remanently magnetized regions in the ferromagnetic element, the magnetic means always being positioned at the intersection of the regions and means for determining the position of the magnet means and, hence, the intersection without altering that position.

In another aspect of the present invention the means for determining the position of the intersection provides an indication of position which is dependent upon the inequality of the incremental permeabilities in small bias fields of the oppositely polarized, remanently magnetized regions of the ferromagnetic element.

In still another aspect of the present invention the ferromagnetic element includes a segment thereof defining the positional limits between which movement of the movable member is monitored, the segment having first and second spaced-apart ends, the distance between the ends defining the length "L" of the segment, the segment comprising a first region, including the first end, having a length "X" wherein, $L \geq X \geq 0$, which is uniformly magnetized (polarized) in a first direction along its entire length "X", and a second region having a length "L−X", the second region being contiguous with the first region and being uniformly magnetized (polarized) in the direction opposite from the first region, the contiguous regions defining an intersection along the length of the segment.

In yet another aspect of the invention the magnet means provides a magnetic field having a constant polarity and a strength at least exceeding the coercive force of the element and sufficient to locally magnetize (polarize) or reverse the magnetization (polarization) of the element as the magnet means moves therealong.

BRIEF DESCRIPTION OF THE DRAWINGS

The invention will be better understood from the following description taken in conjunction with the accompanying in which.

BEST MODE FOR CARRYING OUT THE INVENTION

In accordance with the present invention there is provided a method and apparatus for detecting and providing an indication of the position of a movable member in which a ferromagnetic element is positioned substantially parallel to the path of travel of the movable member and a magnet means is mounted in association with and in fixed and known spatial relation to the movable member for movement therewith and, simultaneously, along the length of the ferromagnetic element. The position of the magnet means defines a pair of contiguous, oppositely polarized, remanently magnetized regions in the ferromagnetic element. By appreciating that the two regions are contiguous and intersect along the length of the element; that the magnet means is always positioned at and defines the position of the intersection; that each of the two regions constituting the ferromagnetic element has a different incremental permeability; and, that the effective overall permeability of the overall length of the ferromagnetic element is dependent upon the position of the magnet means and, hence, of the movable member; the position of the magnet means at the intersection of the regions can be determined. When the position of the magnet means is known the corresponding position of the movable member can readily be determined. It will be appreciated that in another form of the invention, the same result can be achieved by mounting the ferromagnetic element in association with and in known spatial relationship to the movable member for movement therewith and relative to the magnet means at a substantially constant distance from the magnet means.

Figure 1:
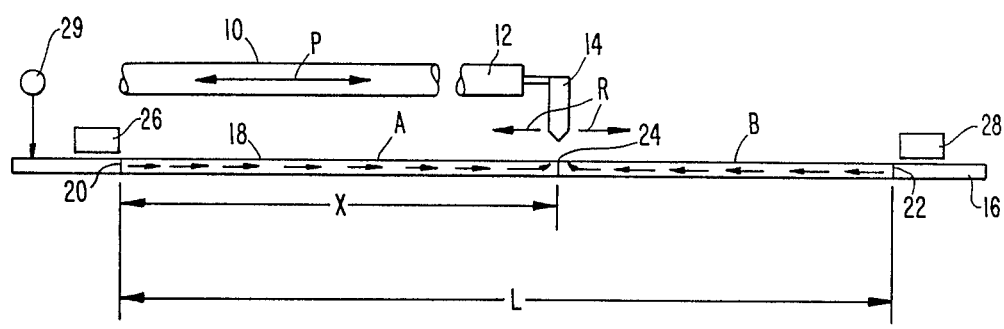
FIG. 1 is a schematic representation of one embodiment of the magnetic position sensor of the present invention.

Referring to the drawings to better understand the invention, and particularly to FIG. 1, a movable member the position of which is to be monitored is shown schematically at 10. Member 10, as illustrated, is capable of linear movement in a horizontal direction as indicated by arrows P. Mounted on one end 12 of member 10, in such a manner as to be movable with member 10, is magnet means 14, functioning as a localized magnetic field source. It will be appreciated that magnet means 14 need not be affixed at end 12 of member 10, but may be located at any point along its length. It may even be indirectly mounted to member 10, as by mounting it on support means which is itself mounted on member 10. The important consideration is that the spatial relationship between member 10 and magnet means 14 is known at all times for all positions of the movable member. In the illustrated embodiment, as member 10 moves along its path of travel (shown by arrows P), magnet means 10 moves along a corresponding path of travel (shown by arrows R).

A ferromagnetic element 16, which is desirably in the form of an elongated rod, tube, ribbon, strip, wire or thin film on a supporting substrate, is positioned substantially parallel to the paths of travel P,R of member 10 and magnet means 14 such that magnet means 14 moves along element 16 as the movable member moves along its path of travel. In its movement along element 16, magnet means 14 traverses a segment 18 of element 16 defined by segment ends 20 and 22, representing the limits between which movement of member 10 will be monitored. The length of segment 18 is denoted by L.

Initially, segment 18 is magnetically preconditioned by uniformly magnetizing (polarizing) the segment in a first axial direction along its length "L". This can conveniently be accomplished, for example, by positioning magnet means 14 at segment end 20 and moving it from left to right in FIG. 1, toward segment end 22, to align the magnetization within the segment in a single direction. When magnet means 14 reaches segment end 22, all magnetization within the segment, random or otherwise, has been realigned and the segment has been polarized. Subsequently, it may be convenient to move magnet means 14 back to position 24, i.e., toward segment end 20. Such movement has the effect of reversing the polarization in the portion of the segment from 22 to 24, i.e., magnetizing portion 22 to 24 in a second and opposite direction. With magnet means 14 situated at 24, two oppositely polarized and remanently magnetized regions, A and B, are defined along the length L of the segment 18. Region A extends from 20 to 24 and has a length X. Region B extends from 24 to 22 and has a length L−X. The length of region A is either less than or equal to the length of segment 18, i.e., X≦L. At the extremes, magnet means 14 may be moved to a position corresponding to end 20 or 22. In the position corresponding to end 22, X=L and L−X=0, i.e., the entire segment 18 corresponds to region A. In the position corresponding to end 20, X=0 and L−X=L, i.e., the entire segment 18 corresponds to region B. The intersection of regions A and B, which are contiguous, is at 24, which is always the position of magnet means 14. It will be appreciated that any further movement of magnet means 14 to the left or right serves to alter the position of the intersection. However, irrespective of the movement of magnet means 14 between segment ends 20 and 22 inclusive, segment 18 remains polarized into two regions, region A of length X which is magnetized in the first direction and region B of length L−X which is magnetized in the second and opposite direction. All that changes with the movement of magnet means 14 is the relative length of each region. No matter where magnet means 14 is located along segment 18 it is always positioned at and defines intersection 24. Therefore, if the location of intersection 24 can at all times be determined then the position of magnet means 14 is known and the corresponding position of any point of interest on movable member 10 can be determined therefrom. The location of intersection 24 is determinable by sensing a characteristic of element 16 which varies with changes in the remanent magnetization of the regions, e.g., permeability, speed of sound, resistance.

Magnet means 14 is a localized field source. As hereinbefore described its purpose is to initially magnetize or polarize, or to reverse the polarization in an already polarized portion of, ferromagnetic element 16. To accomplish this, magnet means 14 desirably provides a magnetic field having a constant polarity and a strength sufficient to polarize, i.e., either locally polarize or reverse the polarization of, element 16. Inasmuch as the position of magnet means 14 is indicative of the position of the movable member and since determining the position of magnet means 14 requires means for highly accurately determining the position of intersection 24 it is important that the magnetic field emanating from magnet means 14 influence the polarization in as local a manner as possible. It is undesirable, for example, from the standpoint of obtaining highly accurate position information, to utilize a magnet means 14 having a magnetic field which is sufficiently strong at a substantial distance from its source that it will influence the polarization of element 16 at a substantial distance from the actual position of the magnet means. On the other hand, it is particularly desirable to utilize magnet means 14 having a magnetic field which is only strong enough to influence polarization of element 16 immediately adjacent the magnet means and which has a field gradient characteristic which causes the field to drop off in intensity very rapidly at even small distances from the actual position of the magnet means. Magnet means which have these desirable characteristics are advantageously positioned closely adjacent element 16 in order to minimize the necessary field strength and to localize the effect of the field. As a minimum, the field strength at element 16 must exceed the coercive force of the element in order to reverse the polarization thereof. More practically, at least where bias fields are employed, the field strength at element 16 should be at least twice the coercive force of the element.

In addition, it should be apparent that the magnet means must provide a constant polarity to element 16. In other words, only one pole of the magnet means can be permitted to influence the polarization of the element. Thus, if the magnet means comprises, as in a preferred embodiment, a conventional permanent magnet, such as an elongated bar magnet of any convenient cross-section, typically circular, it is desirably positioned with one end or pole thereof in close proximity to element 16 and with the other end or pole remote from the element. If desired, for example to increase the field gradient and to narrow the transition range between the two regions A and B, the pole adjacent the element may be conical or chisel-shaped. Moreover, the magnet means need not be a single simple bar magnet shape. Rather, it may comprise two or more magnets symmetrically distributed around element 16 in a plane normal to its axis, with like poles of each magnet toward element 16, or may be U-shaped or C-shaped, or even configured as a fully closed structure to reduce the stray field. Alternatively, in some applications the magnet means may advantageously be an electromagnet.

In addition, the magnet means may be specially configured or specially magnetized for a particular purpose. For example, a magnet means configured as a short, hollow cylinder which has been radially magnetized in such a manner that the inner diameter surface is one pole while the outer diameter surface is another pole has been found to be extremely useful for measuring liquid levels. In this particular application the magnet means may be embedded within a hollow cylindrical float means adapted to float on the liquid surface with the ferromagnetic element (optionally surrounded by a cylindrical protective tube, e.g., of stainless steel) extending vertically through the central opening in the float means to a point adjacent the bottom of the liquid container. When so configured, as the liquid level changes, the float and magnet means move longitudinally along the element with the single pole comprising the inner diameter of the magnet means proximate the element (or its surrounding tube).

It is generally desirable for the magnet means to be oriented with its axis or moment substantially normal to the element's longitudinal axis. When so oriented the influence of the magnetic field on the magnetization of element 16 is most localized and this is generally preferred. However, the axis of the magnet means may be tilted, as hereinafter described, or the magnet means may be asymmetrically shaped or shielded on a single side to expose element 16 to unequal field gradients in order to deliberately produce asymmetric magnetizations in regions A and B. This would be desirable in those instances where it is sought to obtain unequal incremental permeabilities in regions A and B without resort to the use of bias currents, as hereinafter described.

Figure 2:
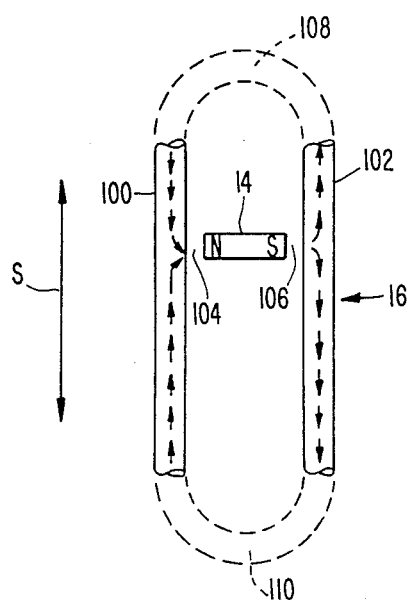
FIG. 2 is a schematic representation of another embodiment of the magnetic position sensor of the present invention.

Referring to FIG. 2 there is illustrated an alternative arrangement for ferromagnetic element 16 and magnet means 14. In this arrangement the path of travel of the movable member is indicated by bi-directional arrows S. Element 16 consists of a pair of parallel, elongated ferromagnetic elements 100,102, which may be independent parallel elements or elements joined at their respective end portions to form an endless ferromagnetic element (shown in phantom). Magnet means 14 is positioned between the elements 100,102 with one pole proximate element 100 and the opposite pole proximate element 102. As magnet means 14 moves, with the movable member, along the path of travel indicated by S, the respective poles of the magnet have opposite polarizing effects on the respective elements 100,102. As a result the available signal from such an arrangement is double that which would be available from a single element arrangement. Moreover, this arrangement reduces the leakage flux from magnet means 14, thereby narrowing the axial length of the transition between regions A and B within each element. In addition, by positioning the magnet means between and spaced from elements 100,102 the effect of the air gap distance between the end of the magnetic pole and the element becomes inconsequential. Increasing one air gap 104 decreases the other air gap 106, allowing common mode rejection of magnet position normal to the axis of the elements. In addition, the end effects attributable to the use of one or more independent elements may be minimized by closing the magnetic circuit, as indicated in phantom at 108,110. Even better performance can be obtained from the arrangement of FIG. 2 and multiple position sensors can be simultaneously employed close to one another without mutual interference by reducing even further the leakage field of the magnet. This can be accomplished by partially or substantially completely surrounding elements 100,102 and magnet means 14 with a generally cylindrical, elongated casing of soft magnetic material to provide shielding from the earth's and other ambient fields as well as from the fields associated with other position sensors. Depending upon the amount of shielding desired the casing may have a cross-section varying between C-shaped and circular (a circular casing may require the provision of means, such as a longitudinally extending slot, for mounting the magnet means, directly or indirectly, to the movable member).

Operation of the magnetic position sensor of the present invention, in one preferred embodiment, as hereinbefore described, is dependent upon the unequal incremental permeabilities of the two regions A and B of the ferromagnetic element, which permits the determination of X, i.e., the intersection position, from measurements which sense the effective overall incremental permeability, over the length L, of segment 18. To better understand the principles underlying operation of the present magnetic position sensor reference is had to FIG. 3 which illustrates a major hysteresis loop of a typical ferromagnetic material useful in the present invention. The hysteresis loop is a plot of applied magnetic field (H) against magnetic flux density (B) (a comparable graphical relationship would result if magnetization (M) was plotted as the ordinate since B and M are related by the equation $B = H + 4\pi M$). Point J on the hysteresis loop of FIG. 3 corresponds to the magnetization at a point along segment 18 when magnet means 14 is proximate to that point, e.g., in moving from its position at 24 towards segment end 22 to enlarge region A. After the magnet means has moved away from that point a sufficient distance that its magnetic field no longer influences the magnetization at that point, the applied field becomes zero, and the magnetization at that point drops to its remanent value, corresponding to A'. Likewise, point K corresponds to the magnetization at a point proximate to magnet means 14 as the magnet means moves from its position at 24 towards segment end 20 to enlarge region B. However, after the magnet means has moved away from that point a sufficient distance that its magnetic field no longer influences the magnetization at that point, the magnetization drops to its remanent value corresponding to B'. The incremental permeability at any point on the loop is defined as the slope, $\Delta B/\Delta H$, of the major axis of the lenticular-shaped minor hysteresis loop which results by applying incremental changes in field, $\Delta H$, at the point of interest. This change in field can be achieved by applying very small AC currents, sufficiently small not to disturb the magnetic state of the ferromagnetic element in any irreversible manner, i.e., of small enough amplitude to maintain resulting magnetization excursions within reversible limits without altering the remanent magnetizations, at that point. It will be appreciated that the incremental permeabilities at points A' and B' (slope at $\Delta B/\Delta H$ at points A' and B') are very similar and insufficiently distinguishable for the differences in these incremental permeabilities to permit a determination of the extent of the respective regions A and B. However, the application of a small DC bias field (shown in dashed lines) to the ferromagnetic element shifts the corresponding magnetization to points A and B in FIG. 3. The minor loops at points A and B are shown adjacent the major hysteresis loop. It can be seen that the slopes of the major axis of these loops, $\Delta B_A/\Delta H$ and $\Delta B_B/\Delta H$, representing the incremental permeabilities $\mu_A$ and $\mu_B$ at points A and B, respectively, are very different and readily distinguishable. Thus, in the DC bias field the reversible incremental permeability $\mu_B$ of region B is much greater than the incremental permeability $\mu_A$ of region A and $\mu_B = c\mu_A$, where c is a constant. The effective overall incremental permeability of segment 18, as shown in FIG. 1, is given by the relationship $$\mu_E = \frac{\mu_A X + \mu_B (L - X)}{L}$$

from which it can be seen that X, the position of the intersection of regions A and B, is a linear function of $\mu_E$ as follows:

$$X = \mu_E \frac{L}{\mu_A - \mu_B} - \frac{\mu_B L}{\mu_A - \mu_B}$$

Expressing X in terms of permeability ratios by substituting $\mu_B = c\,_A$, yields $$X = \left(\frac{\mu_E}{\mu_A} - c\right)\frac{L}{1 - c}$$

Since $\mu_E$ varies from a value $\mu_A$ when X=L to a value $\mu_B$ when X=O, the ratio $\mu_E/\mu_A$ can vary from 1 to c. It will therefore be appreciated that, as hereinbefore stated, the operation of the magnetic position sensor of the present invention to detect X, the position of the intersection, is dependent on there being unequal effective permeabilities in regions A and B. Moreover, inasmuch as operation of the magnetic position sensor improves with increasing ratio of these permeabilities, desirable ferromagnetic materials exhibit substantial variation in incremental permeability with magnetization.

Figure 3:
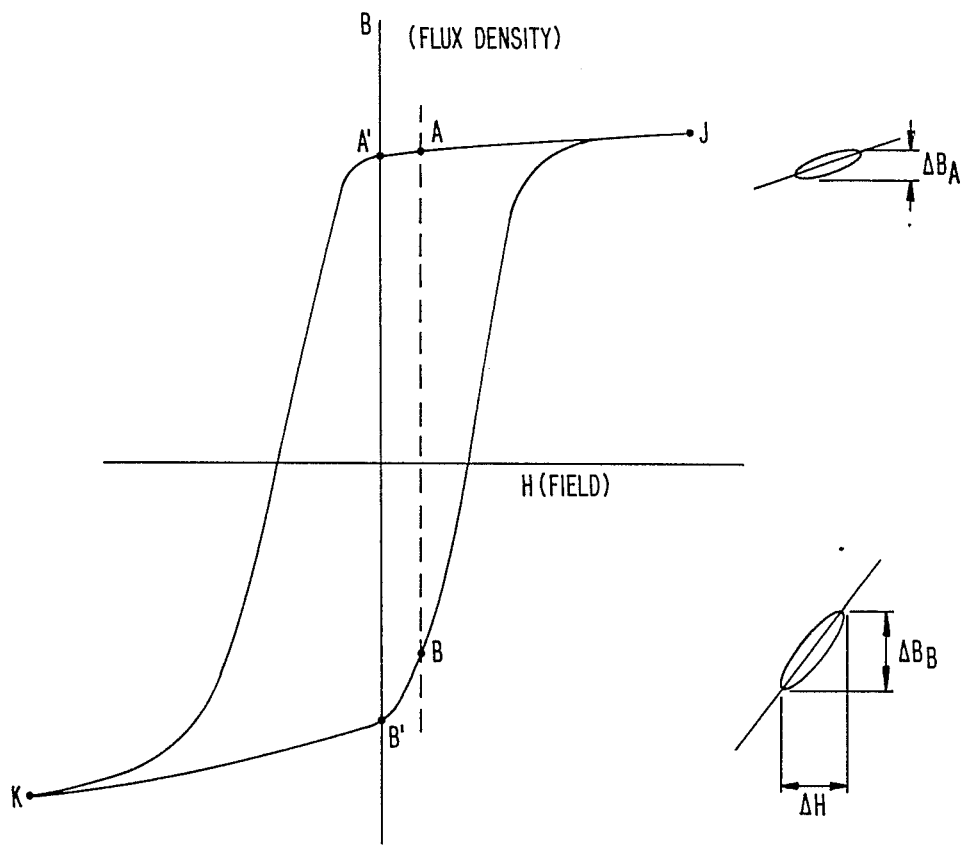
FIG. 3 is a graphical representation of the major and selected minor hysteresis loops of a ferromagnetic, material useful in the sensor of the present invention.

Materials exhibiting typical ferromagnetic hysteresis loops, as illustrated in FIG. 3, generally exhibit an incremental permeability which initially decreases at a moderately rapid rate, but subsequently decreases at a more gradual rate, with increasing magnetization from $\mu_O$, the incremental permeability at M=0 (which is typically 100 to 100,000 for "soft" magnetic materials), to $u_{sat}$ and which approaches a value of 1 at $M_{sat}$. The remanent magnetization, $M_R$, is the magnetization remaining in the ferromagnetic material after being exposed to $M_{sat}$ and the remanence ratio $M_R/M_{sat}$, which varies from 0 to 1, is a measure of the squareness of the hysteresis loop. Neither of these extremes is desirable Since the application of a biasing field to the element causes one of the regions A and B to be biased toward $M_{sat}$ and the other to be biased toward less magnetization, the respective incremental permeabilities will be altered correspondingly by the biasing field. Specifically, the incremental permeabilities will vary from the value at $M_R$ in opposite directions with the increase in permeability (increasing towards $\mu_O$ along the moderately rapidly changing part of the u vs. M curve) generally being larger than the decrease (decreasing toward $\mu_{sat}$ along the more gradual part of the $\mu$ vs. M curve). As a result, the application of a bias field to a suitably ferromagnetic element has the effect of increasing the difference between and the ratio of $\mu_A$ and $\mu_B$.

Bias fields will generally be obtained with direct current except in very short stroke devices when permanent magnets might be used. To preserve power and to avoid heating due to such currents, it is desirable that the ferromagnetic material be selected such that satisfactory operation can be obtained with small bias fields. On the other hand, the magnetic position sensor should not be so sensitive that it reacts to ambient fields from the earth or nearby magnetized objects. Thus the desirable ferromagnetic materials for use in the present invention should be neither magnetically soft, as might be required for transformer cores, motors and other electrical machinery, nor magnetically hard, as might be used in permanent magnets. Materials that are in the desirable range from not especially soft to semihard, i.e., materials having coercivities from about 3 to 100 Oersteds, appear to be ideal and are particularly preferred. Exemplary of such materials are AWS 502 (5.0% Cr, 0.06% C, 0.8% Mn 0.4% Si, 0.5% Mo, balance Fe), AWS 410 (12.3% Cr, 0.2% Ni, 0.08% C, 0.9% Mn, 0.4% Si, 0.4% Mo, balance Fe), 52 Alloy (52% Ni, 48% Fe), Kanthal 70 (70% Ni, 30% Fe), Unimar 300 (17–19% Ni, 7–9.5% Co, 3–5.2% Mo, 0.1–0.8% Ti, 0.05–0.15% Al, up to 0.03% C, balance Fe) and Teledyne Vasco 9-4-20 (9.8% Ni, 3.62% Co, 0.15% C, balance Fe). Best results to date have been obtained with AWS 502 which appears to be stable against environmental magnetism but otherwise sufficiently soft to provide the necessary sensitivity to the magnetic position sensor of the present invention.

Ideally, the ferromagnetic materials selected for use in the present invention should have the aforementioned desired properties after annealing or other heat treatment rather than from cold working since it is important that the properties be homogeneous along the entire length of the element and the distribution of properties resulting from cold work may be difficult to control. If desired, stress due to tension or torsion may be suitably instilled in the element to provide a desirable magnetic anisotropy for modifying the permeability of an otherwise less satisfactory material.

It is well-known that the total inductance, $L_T$, of a coil is a linear function of the permeability of the material it encloses. It follows that inductance is one very convenient way of obtaining a measure of the overall effective incremental permeability of the ferromagnetic material comprising the core of the coil and, thereby, of the differing remanent magnetization of the regions A and B. In accordance with the present invention it has been found that inductance is a very effective way of obtaining a measure of the overall effective permeability of the segment L, comprising the two regions A and B of the ferromagnetic element 16 of FIG. 1, and of determining the distance X, the location of the intersection of regions A and B.

Referring to FIG. 1, if element 16 of cross-sectional area A is overlaid with a solenoidal winding having "n" turns per unit length, the inductance of the portion of the winding in region A (i.e., to the left of the position of magnet means 14) is given by the relationship $$L_A = nXd\phi/di$$

where $\phi$ is the magnetic flux. Expressing the same relationship in terms of flux density (B) and magnetic field (H) yields:

$$L_A = nXAdB_A/di$$

$$L_A = nXA\mu_A dH/di$$

Substituting for the magnetic field yields:

$$L_A = nXA\mu_A(0.4\pi ndi/di)$$

Expressing all constants as the single constant K:

$$L_A = KX\mu_A$$

In like manner, the corresponding expression for region B is:

$$L_B = K(L-X)\mu_B$$

The total inductance of the winding, $L_T = L_A + L_B$, is:

$$L_T = K(X\mu_A + (L-X)\mu_B)$$

Since $\mu_A = b\mu_B$, substituting in the expression for $L_T$ and simplifying, yields $$L_T = K(Xb\mu_B + (L-X)\mu_B)$$

$$L_T = K\mu_B[(b-1)X + L]$$

This relationship confirms that the inductance of a coil wound about ferromagnetic element 16 in FIG. 3 is a linear function of the position X of magnet means 14 and can be advantageously used in designing electrical circuitry which will produce an electrical signal indicative of the position of magnet means 14 along element 16.

Figure 4:
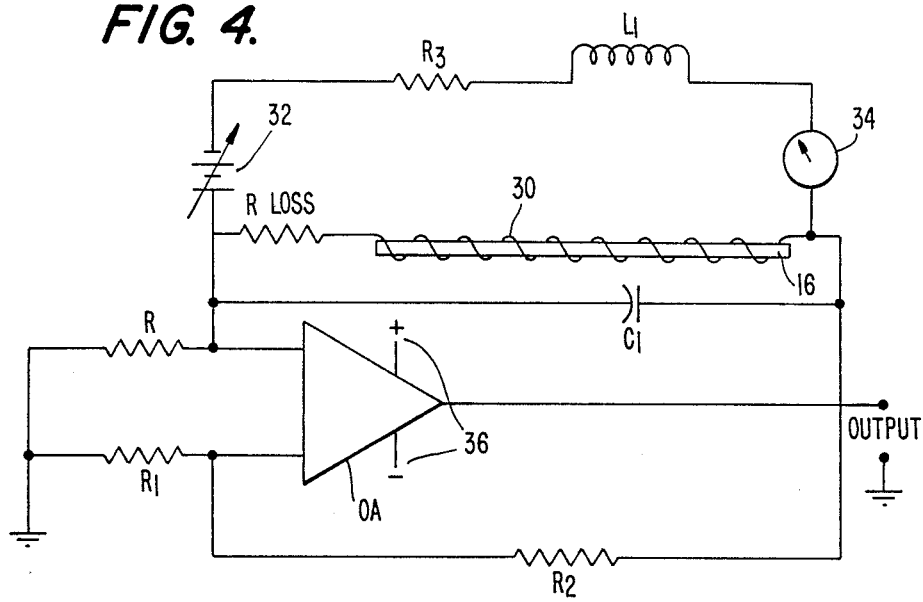
FIG. 4 is a circuit diagram showing one form of circuitry useful in sensing position in accordance with the present invention.

One such exemplary circuit is shown in FIG. 4. This circuit, which includes a single operational amplifier OA and coil 30 wound about element 16 oscillates at a frequency that varies with inductance. The period (1/f) is a linear function of the inductance if $R_{LOSS}$, the resistive loss in solenoid 30, is constant. In actuality, $R_{LOSS}$ increases with frequency; however, the effect of this change can be made negligible by making the resistance R large relative to the largest expected value of $R_{LOSS}$ (typically about 7 ohms). The circuit includes a variable voltage source 32 in series relationship with $R_3$ and $L_1$ and milliammeter 34 to provide the desired DC bias current through the solenoid 30. It is desirable to make the inductance of $L_1$ large compared to the inductance of solenoid 30 (which is typically about 0.2 mH) to effectively block any alternating current from flowing through the biasing circuit. At the same time, $R_3$ is set to a value which only negligibly affects the DC current flowing through the solenoid. Capacitor $C_1$ serves to smooth the output wave shape. Exemplary component parameters for the satisfactory operation of this circuit in accordance with the present invention, with a power input to the circuit at terminals 36 of ±15 volts, are the following:

R = 120 ohms  $L_1$ = 100 mH
$R_1$ = 2700 ohms  $C_1$ = 0.47 ufd
$R_2$ = 1000 ohms
$R_3$ = 370 ohms To demonstrate the use of the circuit of FIG. 4 in a magnetic position sensor such as is illustrated in FIG. 1, a sensor was constructed using a 0.8 mm diameter length of AWS 502 wire as ferromagnetic element 16. The wire was stress relieved by heating with a conducted current of 6 amperes RMS 60 Hz for 6 minutes under which conditions the wire reached an estimated temperature of 500° C.

A solenoidal winding of #34 AWG with heavy formvar insulation was closely wound onto the element 16. The winding length was 39.6 cm with 51 turns/cm. The element was approximately 10 cm longer than the coil and was allowed to protrude therefrom 5 cm at each end to avoid strong demagnetizing fields near the coil ends. The element with its solenoidal winding was laid into a narrow, close fitting groove milled into a wooden board. This board was mounted for support on a milling machine table. A small alnico magnet, 4 mm in diameter by 12 mm long, was mounted in the spindle of the milling machine. The spindle, and therefore the magnet, was oriented normal to the element and approximately centered over it with the end of the magnet spaced from the solenoid by about 1 mm.

With the magnet fixed in place the table was moved relative to the spindle to move element 16 relative to magnet 14. The element was first moved, in a single continuous pass, from one coil end to the other under the magnet to achieve the required initial polarization (magnetic preconditioning). Subsequent relative movement of the element and the magnet was monitored by measuring the period of the output wave from the circuit shown in FIG. 4. A DC bias current of 30 mA was supplied by variable voltage source 32. Although the coil was 39.6 cm (15.6 inches) long, measurements were taken over a segment thereof of length L=38.1 cm (15 inches) at points 2.54 cm (1 inch) apart. This interval was selected since the controls for the milling machine table were calibrated in inches and it was relatively easy to accurately traverse 1 inch lengths of the element with each movement.

Figure 5:
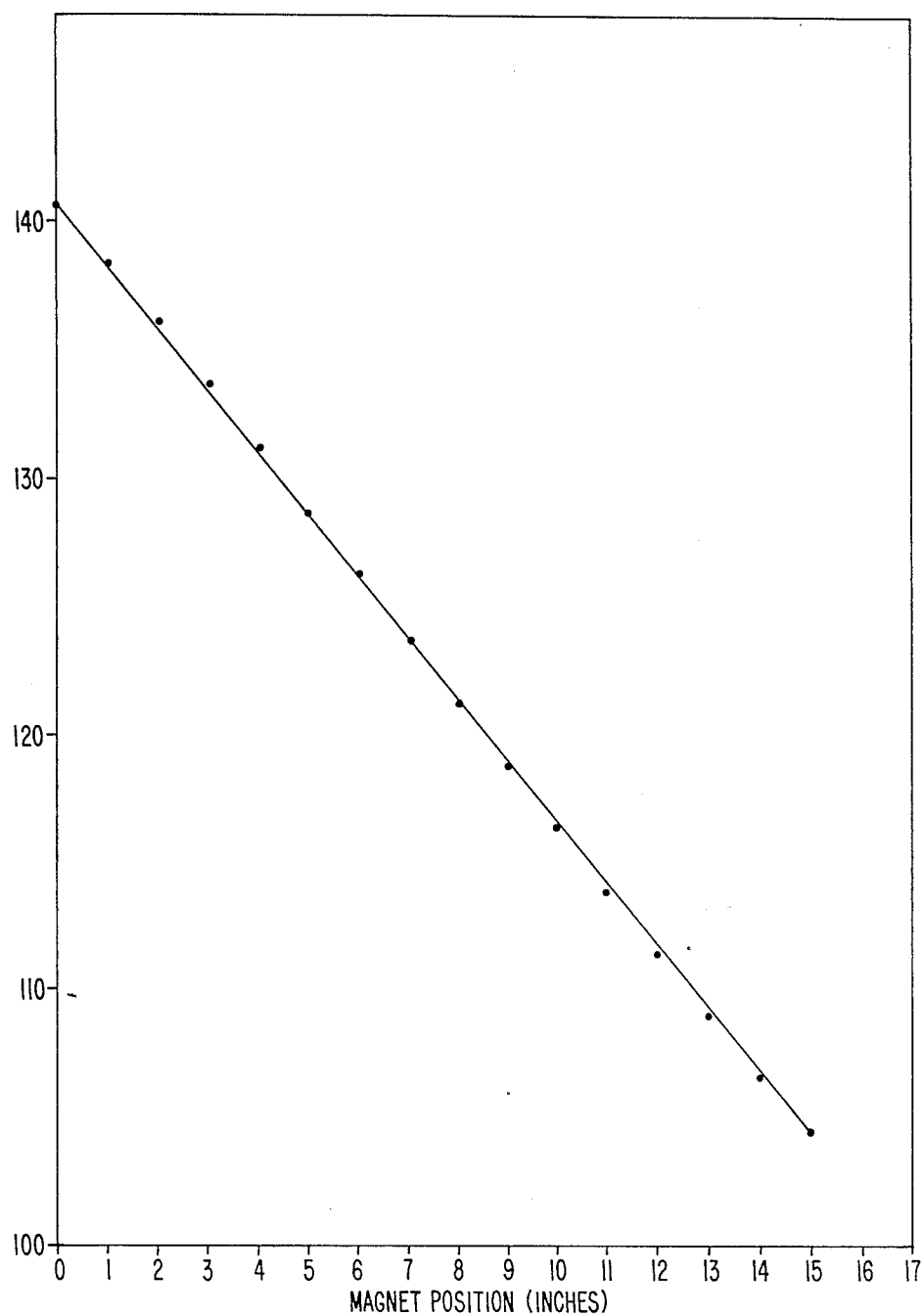
FIG. 5 is a graphical representation of the relationship between magnet position and output signal for the circuitry illustrated in FIG. 4.

The data resulting from this demonstration are graphically illustrated in FIG. 5. It will be appreciated that, with only minor departures, the relationship between the magnet position X, i.e., the distance from segment end 20, and the measured period of the circuit output wave is linear. The largest linearity error in the data, i.e., departure from the illustrated line in FIG. 5, was 1.6%. The largest hysteresis error, obtained when the direction of movement of the magnet, after reaching segment end 22, was reversed and measurements were taken at 1 inch intervals as the magnet returned to segment end 20, was 1.1%. This data is believed to be excellent and justifies use of the sensor in such varied applications as control elements in machinery and liquid level devices, among others. However, the foregoing manner of data evaluation is relatively harsh. It is common in evaluating position sensing devices to use the center as the reference point. If this is done, the performance of the tested sensor improves remarkably. Moreover, if only the center section of the coil is used for position sensing to avoid the adverse influence of end effects, such as fall off of the field within the solenoid (only half as large at the coil ends as at the center) and increase in the demagnetizing field (greatest at the ends), the data improves remarkably. Even if the coil ends are used, these end effects can be minimized by closing the magnetic path, as shown at 108 and 110 in FIG. 2, and winding additional layers of solenoid at the ends.

The linearity of the relationship shown in FIG. 5 is seen to be excellent, except possibly at the very ends where the loss of mutual inductance diminishes the inductance per unit length and the demagnetizing fields of element 16 tend to equalize the intensities of the two remanent states. Since the inductance per unit length varies inversely with the square of the winding pitch, it is possible to compensate for these end effects by concentrating more turns in the end regions of the solenoid. Moreover, by appropriate variation of the winding pitch over the length of element 16, specific, functionally desirable transfer functions for the sensor are attainable. For example, using emprical techniques, the position vs. inductance transfer function can be altered to follow a desired relationship, such as the relationship between liquid level and volume. This approach finds utility in liquid level devices utilizing a floating magnet, where the output signals are made to be proportional to the volume remaining in vessels of non-uniform cross-sections. Unlike vessels such as vertical cylinders, where the volume of liquid in the vessel is a constant function of liquid level, with vessels such as spherical tanks or cylindrical tanks with dished, oval or spherical end caps, the volume of liquid in the vessel is a function of vessel radius as well as liquid level. To account for vessels, such as spheres, whose volume increases or decreases rapidly with only small changes in liquid level, the winding pitch over the length of element 16 may be varied with m ore or less turns (decreased or increased pitch) in sections of element 16 corresponding to areas in which such large volume changes occur. The increased (decreased) concentration of windings provides an increased (decreased) output signal to reflect the increased (decreased) volume change notwithstanding that there has only been a small linear movement of magnet 14.

Figure 6:
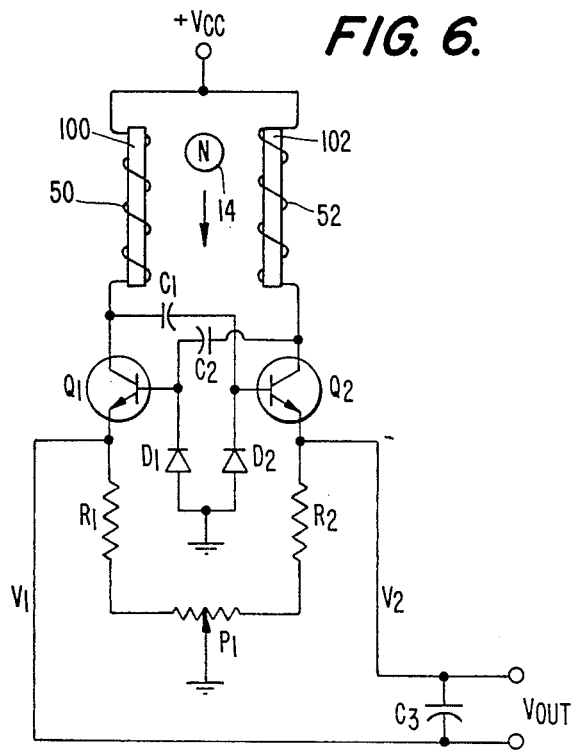
FIG. 6 is a circuit diagram showing another form of circuitry useful in sensing position in accordance with the present invention.

Another exemplary circuit useful in accordance with the present invention is illustrated in FIG. 6 in connection with the use of twin, parallel ferromagnetic elements 100,102, as illustrated in FIG. 2. Solenoids 50,52 are oppositely wound upon elements 100,102 such that they are biased in opposite directions by current flowing from source $V_{cc}$ into adjacent ends. The magnet means 14 is oriented such that the same pole, indicated as the N pole, influences the polarity in each element 100,102. Thus, as magnet means 14 moves along the solenoids from top to bottom, as shown in FIG. 6, the magnet influences the polarity in each element in the same manner but, due to the opposite windings in each element, the inductance of one coil increases while the inductance of the other coil decreases. In the multivibrator circuit shown, only one of the transistors $Q_1$, $Q_2$ conducts at a time, thus allowing a square wave voltage to create a cyclically time varying magnetic field for application to elements 100,102. As the inductance of one coil 50,52 increases while the inductance of the other decreases, this difference in inductance produces different voltage signals $V_1$, $V_2$, the magnitude of which linearly depend upon the relative inductances in the respective collector circuits. The difference in the magnitudes of $V_1$ and $V_2$ appear as $V_{out}$. Interestingly, with a circuit as illustrated in FIG. 6, there is no need to apply a separate DC bias current. This is because the current in each coil 50,52 varies from zero to a finite amount in one direction only and is the equivalent of a DC bias and an AC component.

The very same desired effect, i.e., simultaneously increasing the inductance of one coil while decreasing the inductance of the other coil, can be achieved in other circuit configurations similar to that of FIG. 6. For example, using the same magnet configuration, the coils 50,52 may be wound in the same direction if current from source $V_{cc}$ is made to flow into the respective coils from opposite ends. If the magnet configuration were modified to the configuration shown in FIG. 2, wherein opposite poles of the magnet influence the polarization in each of the elements 100,102, then the desired effect may be achieved with coils 50,52 wound in the same direction with current entering each of the coils from the same end. Alternatively, with the magnet configuration of FIG. 2, the coils 50,52 can be wound in opposite directions if the current from source $V_{cc}$ flows into the respective coils from opposite ends.

Figure 7:
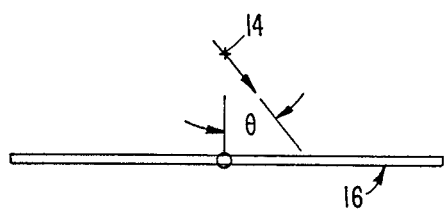
FIG. 7 is a schematic representation of another embodiment of the magnetic position sensor of the present invention.
Figure 8:
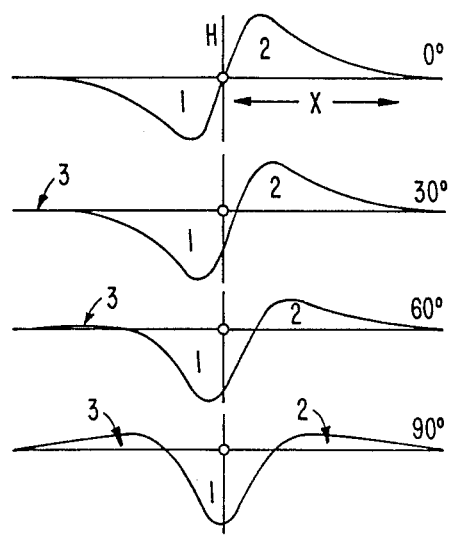
FIG. 8 is a series of graphical representations of the relationship between magnet position and magnetic field for representative tilt angles of the magnet in accordance with the present invention.

It may be desirable for reducing the complexity and costs of the sensing circuits as well as their electrical power requirements to eliminate the bias field used to upset the equality of the magnetization in regions A and B. With an electrically supplied bias field there is also some ambiguity in position indication if the magnet is moved while the power is off. The need for a bias field can be eliminated, in accordance with the present invention, without sacrificing the desired intensity differential between the oppositely polarized element regions A and B by tilting the magnet 14, such that its moment is at a tilt angle $\theta$, away from a position normal to the longitudinal axis of element 16, as can be seen from FIG. 7. Tilting disrupts the symmetry between the oppositely directed magnetizing fields acting on the element, as can be seen in FIG. 8 which graphically illustrates the relationship between the field, H, and "x" which is a normalized distance from magnet 14 along element 16 for representative tilt angles of $\theta=0°$, $\theta=30°$, $\theta=60°$ and $\theta=90°$. The unequal maxima in left and right directed fields is clearly apparent for values of $\theta$ greater than $0°$.

It should be appreciated that except for the small portion of element 16 underlying magnet 14, there is no continuous field of consequential magnitude acting on element 16. Since magnet 14 is the source of the field, those portions of element 16 traversed by movement of the magnet are effectively swept by a characteristic sequence of field maxima as determined by the strength and tilt angle of magnet 14. It can be understood from FIG. 8 that magnetization reversal requires that the field maxima of major lobes 1 and 2 (major field maxima) both exceed the coercive force of element 16. At the same time, the field maxima of lobe 3 must be substantially less than the coercive force. Contrary to the situation where an applied bias field is used to upset the equality of the magnetization in the two regions A and B of element 16, where a tilted magnet is used the field maxima of the weaker of the two major lobes, lobe 2 in FIG. 8, while large enough to exceed the coercive force of element 16, must not be so large that after magnet 14 has passed any point along element 16, the remanent incremental permeability (and remanent magnetization) at that point approaches the saturation level. This is to assure that the lobe 1 field maxima and the lobe 2 field maxim a acting on element 16 produce distinguishable remanent incremental permeabilities. To accomplish this the field maxima of the weaker of the two major lobes is, most desirably, in the range 1.2 to 2.0 times the coercive force of element 16 and is sufficiently smaller than the field maxima of the other major lobe to produce distinguishable remanent incremental permeabilities. Thus, the selection of an optimum tilt angle is interrelated with the strength of the magnet employed. As long as this interrelationship is observed, the selection of a tilt angle, $\theta$, in the range 20° to 70° appears to be satisfactory.

It will be appreciated that notwithstanding that the foregoing illustrative examples have utilized solenoidal windings, the interactive conductor required to provide the bias and alternating fields for sensing the effective permeability of the element may be configured in other ways than solenoidal windings. For example, the ferromagnetic element itself may be used as a conductor or it may be provided with a more conductive core (as by plating the ferromagnetic element onto a conductive wire, strip or ribbon or by passing a conductor through a hollow, e.g., tubular, ferromagnetic element) or it m ay be positioned proximate to a colinear conductor. For example, the ferromagnetic element may be magnetically coupled to a saturable core and the windings positioned on the saturable core. In this way an external magnetic structure may be used to determine the magnetization of the element 16, rather than employing the element itself, which is particularly useful in connection with small devices. If the ferromagnetic element also serves as a conductor, it may be desirable to have an insulating interface between the element and the conductor.

It will also be appreciated that notwithstanding that the present invention has been described primarily in terms of measuring inductance as a convenient means for sensing the position of the intersection between oppositely polarized, remanently magnetized regions A and B, any characteristic of element 16 which varies with changes in the remanent magnetization of the regions may be measured. Thus, it is known that the velocity of sound waves in element 16 varies with magnetization. Inasmuch as the magnetization of regions A and B are different, sound will travel at a different velocity in each of regions A and B and, therefore, depending upon the length of each region the velocity of sound through element 16 will vary. Therefore, if a sound wave generator 26 is located at 20 and a corresponding detector 28 is located at 22, the time required for sound waves to travel along element 16 can be measured and correlated with the position of magnet 14 along element 16. In still another way of sensing the position of the intersection, it is known that the resistance of element 16, due to the magnetoresistance effect, varies with magnetization. Inasmuch as the magnetization of regions A and B are different, the resistance of element 16 depends upon the length averaged resistance of each region. Therefore, the sensed resistance of element 16, as indicated by resistance sensing means 29 schematically illustrated in FIG. 1 can be correlated with the position of magnet 14 along element 16.

Whether or not solenoidal windings are used, the excitation (AC and bias) and sensing circuits may be separated. In the simplest case three colinear conductors, for AC excitation, bias and sensing, may pass through the hollow opening of a tubular ferromagnetic element for providing isolation of the separate circuits. In addition, combinations of linear conductive elements and solenoidal windings may be used. In this connection, it is important to note that interaction between the circular field of a centrally conductive current carrying wire and an external solenoidal winding would be enhanced if the ferromagnetic material were endowed with helical anisotropy, as from torsion, heat treating in a magnetic field or plating techniques. Among the advantages conferred by using magnetic anisotropy is that the voltages generated as a result of the Matteucci effect, the inverse Wiedemann effect, or any combination of the two, may be sensed to detect the position X of the magnet at the intersection of regions A and B. In a ferromagnetic element having helical anisotropy instilled therein, a coaxial conductor and a solenoidal winding thereabout, the flow of AC current through the solenoid causes a voltage, the Matteucci signal, to appear at the ends of the coaxial conductor. The flow of AC current through the coaxial conductor causes a voltage, due to the inverse Wiedemann effect, to appear across the solenoid. Either of these voltages have a linear correlation with incremental permeability and, hence, with position X.

While the present invention has been described with respect to particular embodiments thereof, it will be appreciated that numerous modifications may be made by those skilled in the art without actually departing from the scope of the claimed invention. Accordingly, all modifications and equivalents may be resorted to which fall within the scope of the invention as claimed.

I claim:

1. A position sensor for detecting and providing an indication of the position of a movable member comprising:

a ferromagnetic element oriented substantially parallel to the path of travel of said movable member, said element including a segment thereof having first and second spaced-apart ends defining the positional limits between which movement of said movable member is to be monitored, the distance along said element between said ends defining the length L of said segment, said segment comprising a pair of contiguous, oppositely polarized, remanently magnetized regions, each of said regions being uniformly magnetized along its length, said first region including said first end and having a length X wherein $0 \leq X \leq L$ and said second region including said second end having a length $L-X$, said contiguous regions defining an intersection along the length of said segment;

magnet means positioned proximate said intersection; one of said magnet means and element mounted in association with and in known spatial relationship to said movable member for movement therewith and relative to and along the other of said magnet means and element at a substantially constant distance from one another, said magnet means providing a magnetic field presenting a constant polarity to said element and having a strength sufficient to locally polarize said element, whereby said relative movement between said magnet means and said element alters the length of the respective regions;

means associated with said element for sensing the position of said intersection without altering that position and for providing an indication of the position of said movable member based thereon.

2. A position sensor, as claimed in claim 1, wherein said means for sensing comprises means for sensing a characteristic of said element which varies with changes in remanent magnetization, said sensed characteristic being correlatable with the position of said intersection.

3. A position sensor, as claimed in claim 2, wherein said means for sensing comprises means for sensing the permeability of said element.

4. A position sensor, as claimed in claim 2, wherein said means for sensing comprises means for sensing the speed of sound in said element.

5. A position sensor, as claimed in claim 2, wherein said means for sensing comprises means for sensing the resistance of said element.

6. A position sensor, as claimed in claim 1, wherein said means for sensing comprises means for sensing the effective overall incremental permeability over the length of said element.

7. A position sensor, as claimed in claim 6, wherein said means for sensing further includes means for applying a small DC bias field to said element.

8. A position sensor, as claimed in claim 1, wherein said means for sensing includes coil means wound about said ferromagnetic element and electrical circuit means associated therewith for sensing the inductance of said coil and for providing an indication of the position of said movable member based thereon.

9. A position sensor, as claimed in claim 1, wherein said magnet means has a field strength at said element which exceeds the coercive force of said element.

10. A position sensor, as claimed in claim 7, wherein said magnet means has a field strength at said element at least twice the coercive force of said element.

11. A position sensor, as claimed in claim 1, wherein said magnet means is oriented with its moment tilted at an angle of 20° to 70° from a position normal to the longitudinal axis of said element.

12. A position sensor, as claimed in claim 11, wherein the magnetic field strength of said magnet means is such that both of the major field maxima exceed the coercive force of said element.

13. A position sensor, as claimed in claim 12, wherein the weaker of the major field maxima is 1.2 to 2.0 times the coercive force of said element and is sufficiently smaller than the other major field maxima to produce a remanent incremental permeability which is distinguishable from the remanent incremental permeability produced by the other major field maxima.

14. A position sensor, as claimed in claim 1, wherein said magnet means comprises a permanent magnet.

15. A position sensor, as claimed in claim 1, wherein said magnet means is oriented with its moment substantially normal to the longitudinal axis of said element.

16. A position sensor, as claimed in claim 1, wherein said ferromagnetic element has a coercive force in the range from about 3 to 100 Oersteds.

17. A position sensor, as claimed in claim 1, wherein said ferromagnetic element comprises a single elongated ferromagnetic element.

18. A position sensor, as claimed in claim 1, wherein said ferromagnetic element comprises a pair of parallel, elongated ferromagnetic elements, each said element comprising a pair of contiguous, oppositely polarized, remanently magnetized regions.

19. A position sensor, as claimed in claim 18, wherein said magnet means is positioned between said elements for movement substantially parallel thereto, said magnet means presenting a single, constant polarity to each said element.

20. A position sensor, as claimed in claim 18, wherein said magnet means is positioned between said elements for movement substantially parallel thereto, said magnet means presenting opposite polarity to each said element.

21. A position sensor, as claimed in claim 1, wherein said ferromagnetic element is endowed with intentionally instilled magnetic anisotropy.

22. A position sensor, as claimed in claim 8, wherein the pitch of said coil means is uniform along the length of said element.

23. A position sensor, as claimed in claim 8, wherein the pitch of said coil means is smaller adjacent the ends of said element than along the length of said element intermediate said ends.

24. A position sensor, as claim in claim 8, wherein the pitch of said coil means is non-uniform along the length of said element.

25. A position sensor, as claimed in claims 1, 2, 6, 7, 8, 11, 12 or 24 wherein said magnet means is mounted in association with and in known spatial relationship to said movable member for movement along said ferromagnetic element.

26. A method for detecting and providing an indication of the position of a movable member comprising the steps of:
orienting a ferromagnetic element substantially parallel to the path of travel of said movable member, said element including a segment thereof having first and second spaced-apart ends defining the positional limits between which movement of said movable member is to be monitored, the distance along said element between said ends defining the length L of said segment, said segment comprising a pair of contiguous, oppositely polarized, remanently magnetized regions, each of said regions being uniformly magnetized along its length, said first region including said first end and having a length X wherein $0 \leq X \leq L$ and said second region including said second end and having a length $L-X$, said contiguous regions defining an intersection along the length of said segment;
mounting magnet means in association with and in known spatial relationship to said movable member for movement therewith, and, simultaneously, along said ferromagnetic element at a substantially constant distance therefrom, said magnet means being positioned proximate said intersection and providing a magnetic field presenting a constant polarity to said element and having a strength sufficient to locally polarize said element, whereby movement of said magnet means along said element alters the length of the respective regions;
sensing the position of said intersection without altering that position and providing an indication of the position of said movable member based thereon.

27. A method, as claimed in claim 26, wherein said sensing step comprises sensing a characteristic of said element which varies with changes in remanent magnetization, said sensed characteristic being correlatable with the position of said intersection.

28. A method, as claimed in claim 27, wherein said sensing step comprises sensing the permeability of said element.

29. A method, as claimed in claim 26, wherein said sensing step comprises sensing the speed of sound in said element.

30. A method, as claimed in claim 26, wherein said sensing step comprises sensing the resistance of said element.

31. A method, as claimed in claim 26, wherein said sensing step comprises sensing the effective overall incremental permeability over the length of said element.

32. A method, as claimed in claim 26, wherein said sensing step comprises providing coil means wound about said ferromagnetic element, sensing the inductance of said coil and providing an indication of the position of said movable member based thereon.

33. A method of making a non-contact position sensor for detecting the position of a movable member comprising the steps of:
providing a ferromagnetic element adapted to be oriented substantially parallel to the path of travel of said movable member, said element including a segment thereof having first and second spaced-apart ends defining the positional limits between which the position of said movable member is to be monitored, the distance along said element between said ends defining the length L of said segment;
positioning a magnet means proximate said element for providing a magnetic field presenting a constant polarity to said element and having a strength sufficient to locally polarize said element, whereby relative movement between said magnet means and said element alters the polarity of the portions of said element proximate said magnetic means;
uniformly magnetizing said segment in a first direction along its length L by moving one of said magnet means and said element relative to the other in a single direction along the entire length of said segment between its ends; and
positioning said magnet means along said segment while maintaining said magnet means proximate said element by moving one of said magnet means and said element relative to the other in the opposite direction a distance X wherein $0 \leq X \leq L$, said movement reversing the polarity in the portions of said element along which it moves for defining within said segment a pair of contiguous, oppositely polarized, remanently magnetized regions, each of said regions being uniformly magnetized along its length, said first region having a length X and said second region having a length L-X, said contiguous regions defining an intersection therebetween at the position of said magnet means.

34. A position sensor, as claimed in claim 1, wherein said ferromagnetic element is elongated and said magnet means comprises a hollow, generally cylindrical means having a generally centrally disposed opening defined therein for relative movement along said element with said element extending through said opening, said generally cylindrical means including an inner diameter surface proximate said element and an outer diameter surface remote from said element, said inner diameter surface comprising one pole of said magnet means and said outer diameter surface comprising the other pole of said magnet means.

* * * * *